United States Patent Office 3,644,630
Patented Feb. 22, 1972

3,644,630
INDOMETHACIN SUPPOSITORIES
Donald J. Allen, Gwynedd, and Joseph V. Bondi, Collegeville, Pa., assignors to Merck & Co., Inc., Rahway, N.J.
No Drawing. Filed June 9, 1970, Ser. No. 44,876
Int. Cl. A61k 27/00
U.S. Cl. 424—274    3 Claims

ABSTRACT OF THE DISCLOSURE

The preparation of suppositories which contain indomethacin in a base consisting substantially of polyethylene glycols is described.

---

Suppositories prepared from a polyethylene glycol base are highly desirable since these bases are especially soluble in water and in the secretions of mucous membranes.

Indomethacin is a drug which has anti-inflammatory, analgesic and anti-pyretic properties. The chemical name is 1-(p-chlorobenzoyl)-5-methoxy-2-methylindole-3-acetic acid and is prepared in United States Pat. No. 3,161,654. It is desirable to prepare suppositories of indomethacin which have this polyethylene glycol base. This drug, however, is soluble in polyethylene glycols and therefore dissolves readily in the molten base. Upon congealing, the indomethacin remains in solution in the solid base. This system is therefore physically in an unstable condition which may readily change to a more stable or less stable condition. Since indomethacin is molecularly dispersed in the base, discoloration and esterification often result. Further, a mottled appearance occurs from extremely slow crystallization of the drug within the matrix, and the onset of this crystallization is unpredictable.

The object of this invention is the preparation of a suppository dosage from which contains indomethacin in a base consisting substantially of polyethylene glycols. A further object is the preparation of a suppository which contains indomethacin in a physically and chemically stable condition. Again, it is also the object of this invention to provide indomethacin in an opaque and aesthetically appearing suppository form.

We have found that we are able to prepare a physically and chemically stable indomethacin suppository which consists essentially of a polyethylene glycol base.

We have found that by the addition of from about 4–12% by weight of glycerol U.S.P. to a molten polyethylene glycol base containing dissolved indomethacin, an unexpected stable condition results. The associated discoloration and esterification no longer results and crystallization of the drug in this environment gives an opaque product free from any mottled appearance. Further, the indomethacin of the suppository is both physically stable and chemically less reactive after crystallization in the matrix. This results in a product which is as biologically available as that dispersed at the molecular level.

To practice this invention, a molten solution of indomethacin and polyethylene glycol is prepared, to which is added from about 4–12% by weight of glycerol. This may be prepared in the usual manner at a raised temperature which will provide a molten state. The mass is then subdivided into suppository doses and allowed to congeal by lowering the temperature of the system. (It is convenient to congeal at room temperature.) It is preferred to congeal at 5° C. The indomethacin contained in the suppository crystallizes in the matrix within a short period of time after congealing commences.

The polyethylene glycol base may be made from any suitable polyethylene glycol or mixture thereof of various molecular weights which are used to prepare suppositories that are soluble in water and in the secretions of mucous membranes. The selection of the composition of the base will, of course, depend on the properties desired in the suppository, such as solubility, congealing temperature, acidity, etc. The more preferred bases are those prepared from polyethylene glycol 4000 and polyethylene glycol 6000. The amount of the base used is not a critical feature and will depend on the overall size of the suppository, the desired use, and the dosage of indomethacin in each suppository. The congealing temperature will, of course, depend on the composition of the base.

The following examples are given to illustrate the invention and are not intended to be a limitation thereof.

| Ingredients | Percent by weight | | | |
|---|---|---|---|---|
| Polyethylene glycol 4000 | 88.6 | 84.6 | 80.9 | 77.6 |
| Polyethylene glycol 6000 | | | | 7.8 |
| Glycerol U.S.P. | 4.4 | 8.5 | 12.1 | 7.8 |
| Indomethacin | 7.0 | 6.9 | 6.9 | 6.8 |

The polyethylene glycols are heated to 65° C. and upon melting, the glycerin is added. The indomethacin is dissolved in the molten mass with stirring. The mass is then sub-divided into suppositories containing the desired amount of drug and congealed.

What is claimed is:
1. A suppository preparation which comprises an effective amount of indomethacin in a polyethylene glycol base selected from the group consisting of polyethylene glycol 4000, polyethylene glycol 6000 and mixtures thereof and from about 4–12% by weight of glycerol.
2. A method for preparing a suppository which comprises adding from about 4–12% by weight of glycerol to a molten polyethylene glycol base selected from the group consisting of polyethylene glycol 4000, polyethylene glycol 6000 and mixtures thereof containing an effective amount of indomethacin and allowing said molten mixture to congeal.
3. A method according to claim 1 in which the molten base is prepared at about 65° C. and allowed to congeal at about 5° C.

References Cited

UNITED STATES PATENTS 3,161,654  12/1964  Shen _____ 424—274

OTHER REFERENCES

Physician's Deck Reference (1968), pp. 648 and 840.
Remington's Pharmaceutical Sciences, 13th ed. (1965), pp. 549–556.

STANLEY J. FRIEDMAN, Primary Examiner

U.S. Cl. X.R.

424—361

UNITED STATES PATENT OFFICE
CERTIFICATE OF CORRECTION

Patent No. 3,644,630   Dated February 22, 1972

Inventor(s) Donald J. Allen & Joseph V. Bondi

It is certified that error appears in the above-identified patent and that said Letters Patent are hereby corrected as shown below:

Column 2, line 47, claim 3, "1" should read as --"2"--

Signed and sealed this 13th day of June 1972.

(SEAL)
Attest:

EDWARD M. FLETCHER, JR.
Attesting Officer

ROBERT GOTTSCHALK
Commissioner of Patents